United States Patent [19]

Thannhaeuser et al.

[11] Patent Number: 4,675,883
[45] Date of Patent: Jun. 23, 1987

[54] ARRANGEMENT FOR CARRIER RECOVERY FROM TWO RECEIVED PHASE SHIFT KEYED SIGNALS

[75] Inventors: Gerhard Thannhaeuser, Mering; Alfred Langer, Munich, both of Fed. Rep. of Germany

[73] Assignee: Siemens Aktiengesellschaft, Berlin and Munich, Fed. Rep. of Germany

[21] Appl. No.: 780,894

[22] Filed: Sep. 27, 1985

[30] Foreign Application Priority Data

Oct. 4, 1984 [DE] Fed. Rep. of Germany ....... 3436436

[51] Int. Cl.⁴ .............................................. H03D 3/22
[52] U.S. Cl. ..................................... 375/83; 329/112; 375/97
[58] Field of Search ........................ 375/52, 53, 83–87, 375/120, 97; 329/50, 112, 118, 120, 122; 330/262

[56] References Cited

U.S. PATENT DOCUMENTS

| | | | |
|---|---|---|---|
| 2,167,480 | 7/1939 | Hansell | 250/8 |
| 3,339,143 | 8/1967 | Chaffee | 375/83 |
| 3,349,330 | 10/1967 | Wedmore | 375/84 |
| 3,708,751 | 1/1973 | Starr et al. | 375/83 |
| 3,753,114 | 8/1973 | Burley | 325/320 |
| 4,201,948 | 5/1980 | Natens | 331/8 |
| 4,233,565 | 11/1980 | Chmura | 329/50 |
| 4,298,986 | 11/1981 | Hughes | 375/120 |
| 4,475,218 | 10/1984 | Takeda et al. | 329/124 |

FOREIGN PATENT DOCUMENTS 0106163 4/1984 European Pat. Off. .
2096420 10/1982 United Kingdom .

OTHER PUBLICATIONS

Seymour, R., "A Monolithic RF/IF Amplifier and Its Applications", Wescon Technical Papers, vol. 11, No. 2, 1967, Aug. 8–25, pp. 1–10.

Primary Examiner—Robert L. Griffin
Assistant Examiner—Stephen Chin
Attorney, Agent, or Firm—Hill, Van Santen, Steadman & Simpson

[57] ABSTRACT

An arrangement for carrier recovery of two pulse shift keyed signals comprising a bandpass filter at the input which is followed by a series connection of a full-wave rectifier, a carrier frequency filter and a frequency divider is particularly characterized in that the input signal is converted into a push-pull signal in a transformer and employed for driving an emitter-coupled amplifier, two pairs of emitter-coupled transistors being connected in series between the input and a pair of operational amplifiers. A first of the operational amplifiers is connected to a voltage controlled oscillator. Its output is connected to a first frequency divider, the first frequency divider being connected to a further frequency divider for a further division of two for connection to a demodulator which receives the input signal. The second operational amplifier generates a control signal which is fed, by way of a filter section, to a field effect transistor as a part of a variable resistor connected in the input circuit for controlling the output voltages of the second pair of emitter-coupled transistors which feed the two operational amplifiers.

5 Claims, 4 Drawing Figures

ARRANGEMENT FOR CARRIER RECOVERY FROM TWO RECEIVED PHASE SHIFT KEYED SIGNALS

BACKGROUND OF THE INVENTION

1. Field of the Invention

The present invention relates to an arrangement for recovering carrier from received two phase shift keyed signals comprising a band pass filter at the input which is followed by a series connection of a full wave rectifier, a carrier frequency filter and a frequency divider. The two-phase-shift-keyed (2 PSK) signals are phase-shift modulated signals in which the phase position of a carrier only exhibits the values of roughly 0° or 180°.

2. Description of the Prior Art

The transmission of signals by phase shift modulation is well known in the art. The transmission of digital signals usually occurs as a 2 PSK signal or a 4 PSK signal whereby, therefore, the phase position of a carrier is switched between two or four discrete values. When, for example, the digital signal is a binary signal having an approximated equal distribution of logical ones and zeros, then the phase positions of the carrier of 0° and 180° in the 2 PSK signal are distributed equally, so that the amplitude of the carrier is nearly zero. However, it is known that the demodulation of a 2 PSK signal in a disturbed channel can only be optimum with respect to the signal-to-noise ratio or, respectively, the bit error rate of the recovered binary signal when a synchronous demodulator with carrier supplied and proper phase is employed for the demodulation. The necessity of recovering the carrier from the received 2 PSK signal therefore occurs.

FIG. 1 illustrates a known arrangement for carrier recovery for a 2 PSK signal. The band pass filter BP is located at the receiving side input, its center frequency being identical to the carrier frequency and its bandwidth being at least twice the clock frequency or, respectively, the Nyquist frequency of the binary signal. The output signal of the band pass filter is supplied to the signal input of the synchronous demodulator DEM and is also supplied to the input of a full-wave rectifier or squaring element Q. In squaring, the prefiltered 2 PSK signal is multiplied by itself; sum frequencies of all spectral components in the upper and lower sidebands thereby also arise. The components which lie symmetrically relative to the suppressed carrier appear at twice the carrier frequencies; they add up due to the correlation of the upper side band and the lower side band. In a narrow band carrier frequency filter F, these energy components are largely rid of the undesired mixed products which arose during squaring and are output to a following amplitude limiter. After the amplitude limitation, the generation of the carrier occurs in a frequency divider in the division ratio 2:1, this carrier being output to the carrier input of the synchronous demodulator DEM. The demodulation of the 2 PSK input signal occurs in the synchronous demodulator; an amplitude discriminator AE from which a binary signal BS is output is connected to the output of the demodulator by way of a low pass filter TP.

A multiplication of the recovered carrier at the receiving side is undertaken by the signal in the synchronous demodulator; an optimum demodulation of the 2 PSK signal with maximum signal-to-noise ratio only occurs given a proper phase relation of the recovered carrier. Since the phase of the recovered carrier in all carrier recovery circuits for 2 PSK signals can amount to 0° or 180° due to the derivation from the correlation of the signal sidebands or, respectively, due to the 2:1 frequency division, the generated carrier is affected with this uncertainty. In order to avoid this uncertainty in the transmission of 2 PSK signals, a signal in differential binary code wherein the information is transmitted in the signal changes is usually employed as the modulating binary signal.

A relatively high expense for carrier recovery occurs in this known art since, among other things, filters are required for this purpose which must have a high temperature stability and aging stability with respect to the phase stability of the recovered carrier given high selection at the same time.

SUMMARY OF THE INVENTION

The object of the present invention, therefore, is to provide an arrangement for carrier recovery from received 2 PSK signals which is simplified with respect to the prior art.

The above object is achieved in an arrangement of the type set forth above which is particularly characterized in that the input signal is converted into a push-pull signal in a transformer arrangement and employed for the drive of an emitter-coupled amplifier; in that the collector terminals of the transistors of the first amplifier are connected to one another and to the combined emitter terminals of the transistors of a second emitter-coupled amplifier. Furthermore, the collector terminals of the transistors of the second amplifier are connected to collector resistors and operating voltage and the collector terminal of one transistor is connected to the inverting input of a first operational amplifier while the collector terminal of the other transistor is connected to the non-inverting input of the same operational amplifier. The arrangement is further characterized in that the output terminal of the operational amplifier is connected to the control input of a voltage-controlled oscillator whose output terminal is connected to a first frequency divider having a division ratio of 2:1. Furthermore, the mutually complementary outputs of the first frequency divider are respectively separately connected to the base terminal of the transistors of the second amplifier and the output of the first frequency divider is connected to the input of a second frequency divider having the division ratio of 2:1, the desired carrier signal being applied to the outputs of the second frequency divider.

The advantage of the arrangement of the present invention, in particular, is that in the squaring of the 2 PSK input signals, an offset-free phase regulation and an amplitude regulation are provided by a single arrangement which acts as a combined phase-amplitude comparator and represents a phase control loop.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
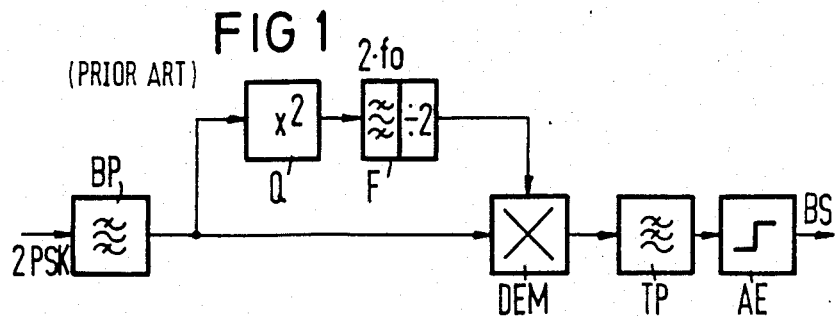
FIG. 1 is a schematic diagram of a known arrangement for the demodulation of 2 PSK signals comprising an arrangement for carrier recovery.

FIG. 1 has been discussed above and further reference thereto at this point is superfluous.

Figure 2A:
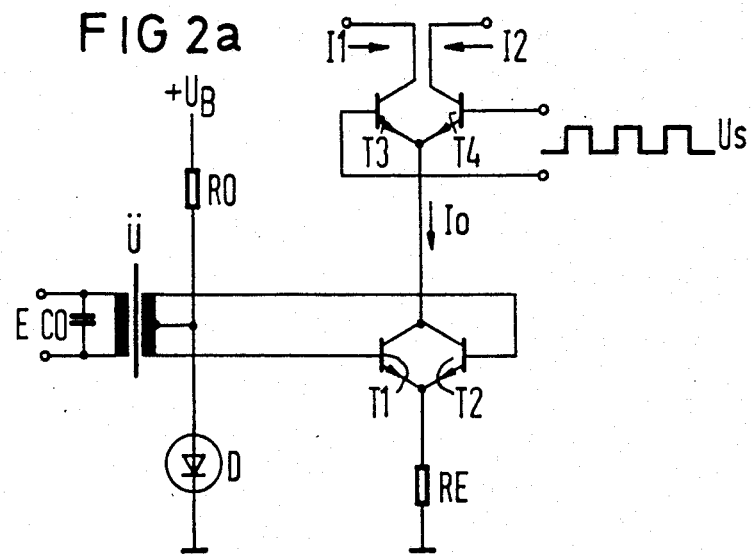
FIGS. 2a and 2b are schematic circuit diagram of a basic circuit constructed in accordance with the present invention for carrier recovery with a phase diagram, the basic circuit being illustrated in FIG. 2a and the phase diagram being illustrated in FIG. 2b.

Referring to FIG. 2a, a basic diagram of a portion of the arrangement constructed in accordance with the present invention for carrier recovery is illustrated. The two primary winding terminals of a transformer Ü, as well as the two terminals of the capacitor CO are connected to an input E for receiving the input signal. In combination with the capacitor CO, the inductance of the transformer Ü acts as a bandpass filter; the secondary winding of the transformer is center-tapped and is connected to a base voltage divider which is formed by a resistor RO and a diode D connected between, for example, ground and a reference potential $U_B$. The two external terminals of the secondary winding of the transformer Ü are respectively connected to a base terminal of a first or, respectively, second transistor T1, T2 whose emitter terminals are connected to one another and, via a resistor RE, to the reference potential, here ground. The two transistors, whose threshold voltage is compensated by the diode D, are therefore driven in the push-pull mode of operation. Since the collector terminals of both transistors are connected to one another, a sum collector current Io occurs which is proportional to the absolute value of the input voltage and to the reciprocal of the resistance of the resistor RE. A full wave rectification for the signal at the input E therefore already exists. As a result of the full-wave rectification, twice the frequency, in comparison to that of the input signal, occurs with respect to the ripple of the current Io; a signal having twice the carrier frequency is therefore present, so that the squaring function is already realized. The emitter terminals of a third transistor T3 and a fourth transistor T4 are connected to the collector terminals of the two transistors T1 and T2; the base terminals of both transistors are supplied with a symmetrical rectangular voltage Us which are phase shifted by 180° relative to one another, these being supplied with twice the carrier frequency. As a result of this rectangular voltage, the third transistor T3 and the fourth transistor T4 are switched so that mutually phase-shifted currents I1, I2 flow via the collector terminals of these transistors. The difference between the mean values of the currents is thereby a function of the phase shift between the components having twice the carrier frequency in the combined collector current Io of the first two transistors T1, T2 and of the rectangular voltage Us.

The input voltage Ue, the sum collector current Io of the two first transistors and the rectangular voltage Us which switches the third and fourth transistors T3, T4 are illustrated above one another in FIG. 2b.

On the drawing, the phase of the rectangular voltage Us is shifted by 90° with respect to the phase of the carrier wave component in the sum current Io; the difference of the mean DC values of the collector currents I1, I2 of the third and fourth transistors T3, T4 is thereby equal to 0. The difference between the collector currents I1, I2 of the two transistors T3, T4 is an expression of the phase relation between the rectangular voltage Us and the input voltage Ue with an approximated sine characteristic and can be employed as a control criterion in a phase-controlled loop; furthermore, however, the sum of these two currents is equal to the sum current Io whose mean DC value is proportional to the input voltage Ue and which is therefore available as a control criterion for an amplitude regulation at the input side.

Figure 2B:
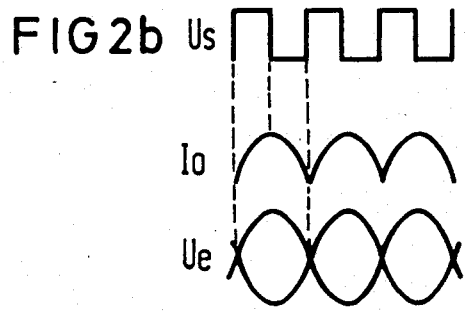
Figure 3:
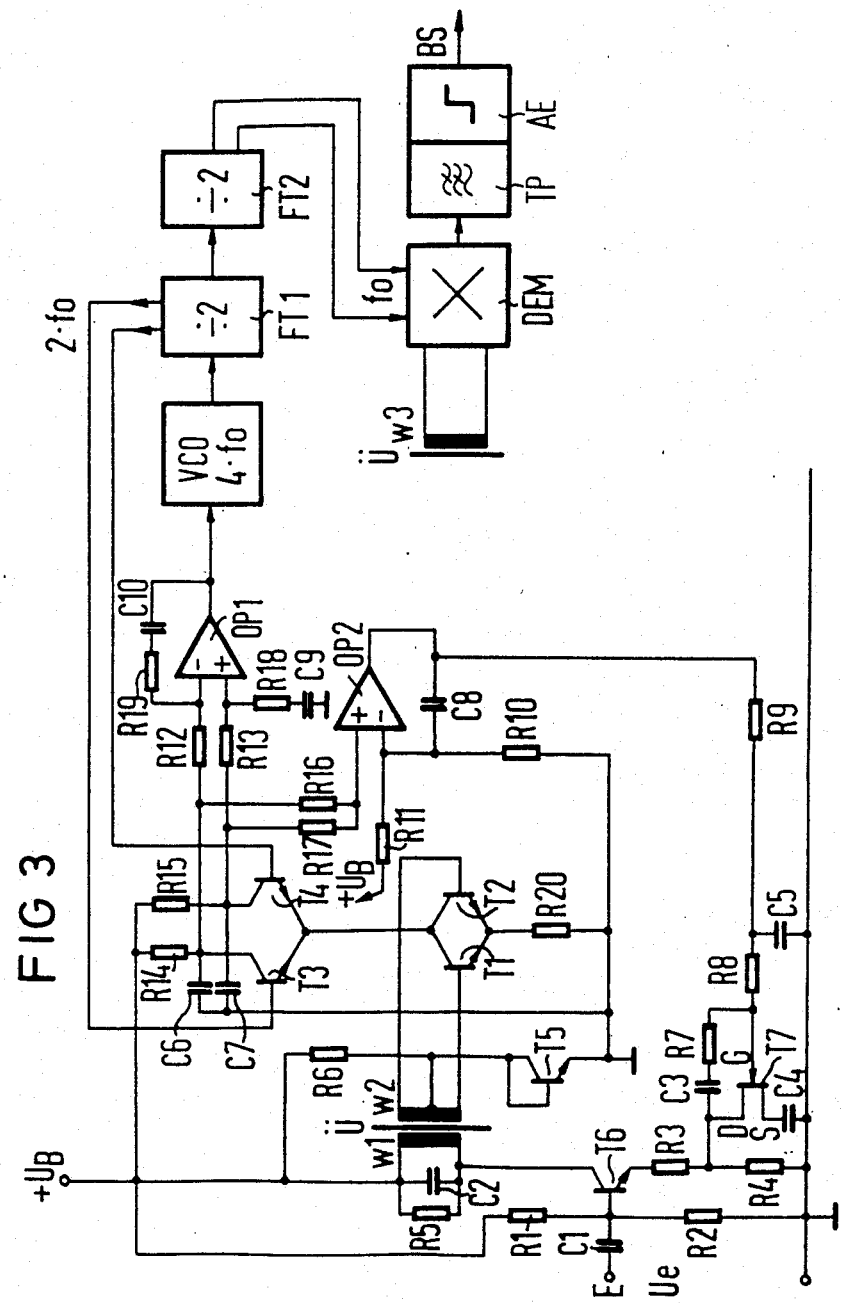
FIG. 3 is a detailed circuit diagram of an arrangement constructed in accordance with the present invention for carrier recovery.

The arrangement for carrier recovery is illustrated in greater detail in FIG. 3 and comprises a preamplifer stage, containing a sixth transistor T6 in addition to the two emitter-coupled amplifiers formed of the transistors T1 . . . T4 with the fifth transistor T5 connected as a diode. The input E is connected by way of a first capacitor C1 to the base terminal of the sixth transistor T6; the base bias voltage for this transistor is generated by way of a base voltage divider formed of a first resistor R1 and a second resistor R2. The emitter terminal of the transistor is connected to a reference potential by way of the series connection of a third resistor R3 and a fourth resistor R4; moreover, the drain terminal of a seventh transistor T7, for gain control, is connected to the third resistor R3. The collector terminal of the sixth transistor T6 is connected to a terminal of the primary winding of the transformer Ü, whose other terminal is connected to the operating voltage $+U_B$. A second capacitor C2 and a fifth resistor R5 are additionally connected in parallel to the primary winding w1. The center terminal of the secondary winding w2 of the transformer Ü is connected, on the one hand, to the operating voltage source $+U_B$ via a sixth resistor R6 and, on the other hand, to the reference potential by way of a fifth transistor T5, as mentioned above connected as a diode, so that the base voltage divider for the first and second transistors T1 and T2, already shown in FIG. 2, is derived therefrom. In accordance with FIG. 2a, the collector terminals of the transistors T1 and T2 are connected to the combined emitters of the transistors T3 and T4 and the collector terminals of the transistors T3 and T4 are connected to a reference potential by way of respective capacitors C6 and C7. The collector terminal of the third transistor T3 is also connected, via a twelfth resistor R12, to the inverting input of the first operational amplifier OP1 and the collector terminal of the fourth transistor T4 is connected by way of a thirteenth resistor R13 to the non-inverting input of the first operational amplifier OP1. The collector terminals of the two transistors T3, T4 are also connected by way of a fourteenth or, respectively, fifteenth resistor R14, R15 to the operating voltage $+U_B$ and are connected by way of a sixteenth or, respectively, seventeenth resistor R16, R17 to the noninverting input of a second operational amplifier OP2. The inverting input of the second operational amplifier OP2 is connected to the reference potential by way of a tenth resistor R10, is connected to the operating voltage $+U_B$ by way of an eleventh resistor R11 and is connected to the output of the second operational amplifier OP2 by way of an eighth capacitor C8. This output terminal is also connected by way of a filter section composed of a ninth resistor R9 and a fifth capacitor C5, as well as an eighth resistor R8, being connected to the gate terminal of the seventh transistor T7; this gate terminal also being connected by way of the series connection of the third capacitor C3 and the seventh resistor R7 to the drain terminal of this transistor, whose source terminal is connected to the reference potential by way of a fourth capacitor C4. The combined emitter terminals of the first and second transistors T1 and T2 are connected to the reference potential by way of a twentieth resistor R20.

The non-inverting input of the first operational amplifier OP1 is connected to the reference potential by way of the series connection of a ninth capacitor C9 and an eighteenth resistor R18, whereas the inverting input of the operational amplifier OP1 is connected to the output of this operational amplifier via a tenth capacitor C10 and a nineteenth resistor R19. A voltage-controlled oscillator VCO is connected to this output, the voltage-controlled oscillator VCO generating an oscillation having a frequency corresponding to four times the carrier frequency 4×fo. A first frequency divider FT1 having a division ratio of 2:1 is connected to the output terminal of the oscillator VCO; the two mutually complementary outputs of this frequency divider are connected to the base terminal of the third or, respectively, fourth transistor T3, T4 and supply these terminals with the rectangular voltage Us shown in FIG. 2 and having a frequency corresponding to twice the carrier frequency. Also connected to an output terminal of the frequency divider is the input of a second frequency divider FT2; the frequency divider FT2 has a division ratio of 2:1 and generates the desired carrier, as two complementary outputs being connected to assigned inputs of a synchronous demodulator DEM according to FIG. 1. Furthermore, the signal inputs of the demodulator are connected to terminals of a further secondary winding w3 of the transformer Ü. The demodulator DEM is followed by a low pass filter TP and by an amplitude discriminator AE, in accordance with FIG. 1.

The manner of operation of the arrangement for carrier recovery is basically explained with reference to FIG. 2; details shall be discussed below. The 2 PSK signal is supplied by way of the coupling capacitor C1 to the base terminal of the amplifier transistor T6 in whose collector circuit the band pass filter, already described above, is connected. The bandwidth of the band pass filter is set such by the fifth resistor R5 that it corresponds to about twice the clock frequency of the data signal with which the carrier is modulated. The center frequency of the band pass filter corresponds to the frequency of the carrier fo. In accordance with FIG. 2, the combined phase-amplitude regulator is composed of the transistors T1, T2 as well as the transistors T3, T4. The transistor T5 is connected as a diode for compensation of the threshold voltages of the transistors T1 and T2. In this exemplary embodiment, the transistors T1–T5 are monolithically integrated, in common, for reasons of low offset.

As already described in conjunction with FIG. 2, a current having twice the carrier frequency flows in the common emitter resistor of the transistors T1, T2, as well as in the common collector line. Due to a rectangular differential voltage at the base terminals of the third and fourth transistors T3 and T4, this current is switched between these two transistors. The switch-over voltage required for this purpose has twice the carrier frequency 2fo and is generated by the first frequency divider FT1 which follows downstream of the controllable oscillator VCO in FIG. 3. Accurately symmetrical drive voltages are generated by way of this generation circuit on the basis of frequency dividers. The collector resistors R14, R15 of the transistors T3, T4 have identical values of resistance and form a respective low pass filter with the capacitor C6, C7, which are likewise of identical size. The difference between the collector voltages of the transistors T3 and T4 is proportional to the phase deviation between the switch-over voltage Us at the base terminals of the third transistor T3 and the fourth transistor T4 and the signal component having twice the carrier frequency 2fo contained in the combined collector current of the first transistor T1 and the second transistor T2. The described arrangement therefore represents the phase demodulator of the phase-control loop for carrier recovery. The first operational amplifier OP1 forms the active loop filter of the phase-control loop in which the voltage difference between the collector voltages of the third and fourth transistors T3 and T4 is converted into a control voltage for the frequency regulation of the controllable oscillator VCO. The first operational amplifier OP1 is thereby connected as a symmetrical-asymmetrical converter, so that only the difference between the collector voltages of the transistors T3 and T4 is evaluated. In addition to the capacitor pair C9, C10, therefore, the resistor pairs R12, R13 and R18, R19 are also respectively dimensioned of identical size.

The active loop filter formed by the first operational amplifier OP1 has a proportional-integral characteristic (PI behavior); the static value of the voltage difference must therefore be 0 in the full lock-in range of the phase-control loop so that the relative phase relation between the switching voltage Us and the input signal Ue remains constant in the locked condition as illustrated in FIG. 2b. The edges of the switch-over voltage Us coinciding in time with the zero crossings of the input signal can therefore be employed for driving a second frequency divider which generates the desired carrier frequency with the exact phase relations 0° or 180° with respect to the 2 PSK signal.

As a result of multiplication of the amplifier input signal and the recovered carrier, a binary signal is generated in the synchronous demodulator DEM, this binary signal being supplied by way of a low pass filter TP to an amplitude discriminator AE and converted into a rectangular signal. The low pass filter TP forms the entire selection, together with the input bandpass filter at the transformer. In the exemplary embodiment, the bandwidth of the input bandpass filter is selected greater by the factor 2 than the clock frequency so that practically the entire carrier frequency selection in the low pass filter TP is shifted. What thereby occurs is the function of a tracking filter whose center frequency is always identical to the carrier frequency. As a result, the problem of a detuning of a center frequency of bandpass filters with the conversion of amplitude modulation in phase modulation resulting therefrom no longer occurs.

In addition to the difference between the collector voltages of the transistors T3, T4 the arithmetic mean value of the collector voltages is also of significance for the described carrier recovery circuit. The mean value is completely independent of the phase relation between the switch voltage Us and the sum collector current of the transistors T1, T2; however, it is a direct measure for the input voltage and can therefore serve as a control signal for a level control at the input side. The second operational amplifier OP2 is provided for level control, the operational amplifier OP2 receiving a reference voltage at its inverting input by way of the voltage divider formed by the tenth and eleventh resistors R10, R11 and likewise exhibits a proportional-integral characteristic due to the feedback from the output to the inverting input by way of the eighth capacitor C8. A control signal is output from the output of the second operational amplifier OP2 by way of a filter section to the gate electrode G of the field effect transistor T7 which is inserted as a variable resistor in the emitter-side inverse feedback of the preamplifier with the transistor T6. This control signal provides that the input level is controlled to that voltage value which corresponds to the mean value of the voltage drops at the resistors R14 or, respectively, R15 which is of the same size as the voltage drop of the eleventh resistor R11.

The low pass filter inserted between the output of the second operational amplifier OP2 and the gate electrode of the field effect transistor T7 contains the eighth resistor R8 whose value corresponds to that of the seventh resistor R7 in the connection between the gate electrode G and the drain electrode D of the transistor T7. Under the precondition that the impedances of the third and fifth capacitor C3 and C5 are small in comparison to the resistors R7 and R8, a superimposed AC voltage component appears at the gate electrode G of the field effect transistor T7 in addition to the controlling DC component, the AC voltage component corresponding to about half the voltage between the drain and source electrodes D, S of the field effect transistor T7 due to the voltage divider effect between the resistors R7 and R8 of identical size is considerably improving the harmonic distortion behavior of the field effect transistor regulating unit.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for carrier recovery from received two phase shift keyed signals, in which a carrier is modulated at a predetermined clock frequency, the arrangement being of the type having a band pass filter at the input followed by a series connection of a full wave rectifier, a carrier frequency filter and a frequency divider, the improvement therein comprising:
    a transformer arrangement connection to said input for converting the input signal into a push-pull signal;
    an emitter-coupled amplifier connected to receive the push-pull signal;
    said emitter-coupled amplifier comprising first and second transistors each including a collectior connected to the collector of the other transistor, a base connected to receive the push-pull signal, and an emitter connected to the emitter of the other transistor and via a resistor to a reference potential;
    a second amplifier comprising third and fourth transistors each including an emitter connected to the collectors of the first and second transistors, a collector and a base;
    a first operational amplifier including an inverting input and a non-inverting input and an output, said collector of said third transistor connected to said inverting input and said collector of said fourth transistor connected to said non-inverting input.
    a voltage-controlled oscillator including a control input connected to said output of said first operational amplifier, and an output;
    a first frequency divider having a division ratio of 2:1 connected to said voltage controlled oscillator and including mutually complementary outputs respectively connected to said bases of said third and fourth transistors of said second amplifier, and a further output;
    a second frequency divider connected to said further output and comprising a pair of mutually complementary outputs and a division ratio of 2:1; and
    said outputs of said second frequency divider constituting a carrier output for the desired carrier signal.

2. The improved arrangement of claim 1, and further comprising:
    a second operational amplifier including an inverting input and a non-inverting input, and an output, said inverting input connected to a reference potential and said non-inverting intput connected to said collectors of said third and fourth transistors;
    a capacitor connected between said output of said second operational amplifier and said inverting input;
    a field effect transistor including a drain-source path and a gate, said gate connected to said output of said second operational amplifier; and
    said input comprising a transistor including one electrode connected to said transformer and another electrode connected by way of a further resistor to the reference potential, said drain-source path of said field effect transistor connected in parallel to said resistor.

3. The improved arrangement of claim 2, wherein:
    said transformer includes a primary winding connected to said input transistor;
    a parallel capacitor-resistor combination connected across said primary winding constituting a band pass filter having a bandwidth comparatively large in comparison to the clock frequency;
    a center-tapped secondary winding with the tap connected to an operating voltage via a resistor;
    an additional diode connecting said tap to the reference potential; and
    said secondary winding comprising a pair of terminals connected to said bases of said first and second transistors.

4. The improved arrangement of claim 3, wherein:
    said first, second, third and fourth transistors and said diode are constructed in common on an integrated circuit.

5. The improved arrangement of claim 3, wherein:
    said diode comprises a transistor including a base, a collector connected to said base, and an emitter connected to a reference potential.

* * * * *